United States Patent [19]

Bodson

[11] 4,005,174
[45] Jan. 25, 1977

[54] PROCESS FOR THE ELIMINATION OF CHLORIDE FROM ZINC SULPHATE SOLUTIONS

[76] Inventor: Fernand Jacques Joseph Bodson, 35, Quai Saint Paul de Sincay, B.4900 Angleur, Belgium

[22] Filed: June 17, 1975

[21] Appl. No.: 587,629

[30] Foreign Application Priority Data

June 17, 1974 Belgium ............................ 816468

[52] U.S. Cl. .................................. 423/43; 423/46; 423/103; 423/493; 423/544

[51] Int. Cl.² .......................................... C01G 3/04

[58] Field of Search ............... 423/34, 42, 46, 103, 423/493, 544, 38, 101, 43

[56] References Cited

UNITED STATES PATENTS

| 1,901,925 | 3/1933 | O'Brien et al. | 423/103 |
|---|---|---|---|
| 2,586,579 | 2/1952 | Supiro | 423/34 |

FOREIGN PATENTS OR APPLICATIONS

| 18,900 | 1892 | United Kingdom | 423/46 |
|---|---|---|---|
| 370,965 | 4/1932 | United Kingdom | 423/544 |

Primary Examiner—Oscar R. Vertiz
Assistant Examiner—Wayne A. Langel
Attorney, Agent, or Firm—Young & Thompson

[57] ABSTRACT

A process for removing chlorine from a solution of zinc sulfate, in which the pH of the solution is reduced to below 2.6 with sulfuric acid. Cupric ions are established in the solution in an amount such that after removal of the chlorine by precipitation as cuprous chloride, there remains an excess of cupric copper in the solution which is greater than 0.5 g/l. The cupric ions can be added by adding cupric sulphate and zinc powder, or cupric salt and metallic copper, or cupric copper followed by cuprous oxide. The cuprous chloride precipitate is collected and washed and treated with sodium hydroxide in an amount to raise the pH to more than 7, thereby to precipitate cuprous oxide which is separated by filtration.

9 Claims, 1 Drawing Figure

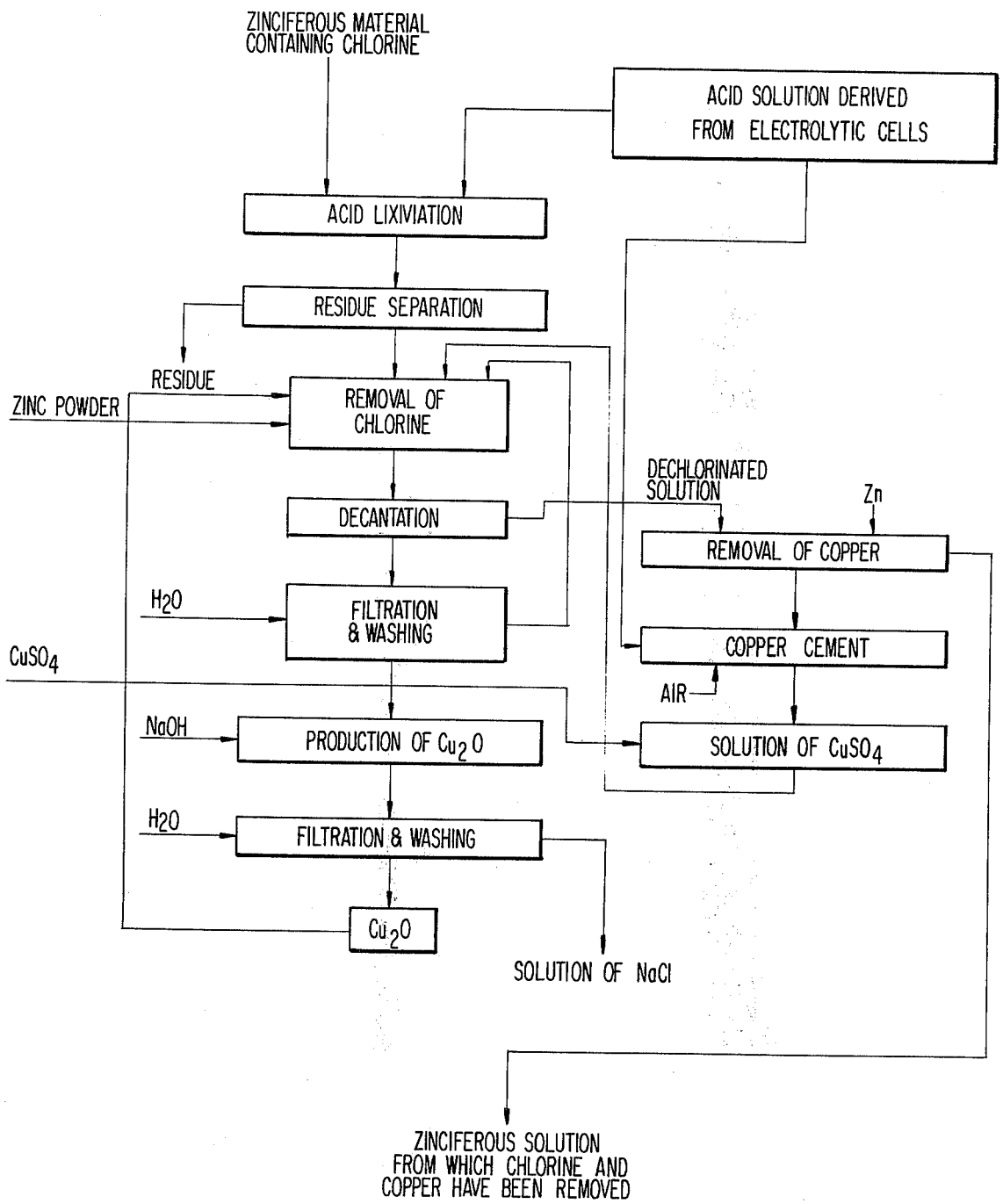

PROCESS FOR THE ELIMINATION OF CHLORIDE FROM ZINC SULPHATE SOLUTIONS

This invention relates to a process for removing chlorine from a solution of zinc sulphate.

It is known that some basic materials which contain zinc also contain chlorine. The presence of soluble chlorine in the basic materials prevents the materials from being treated by hydrometallurgical processes, because the solutions circulate in the system in such a way that there is an accumulation of chlorine. The chlorine is very troublesome since it accelerates the corrosion of apparatus used for carrying out the process even if the apparatus is made of stainless steel, which is particularly the case for apparatus used in zinc ferrite leaching processes at high temperatures and in an acid medium.

Moreover, if the chlorine content exceeds certain limits in the baths which are subjected to electrolysis, there is partial liberation of chlorine at the anode. This pollutes the atmosphere, which not only becomes unpleasant for the work personnel but also corrodes the apparatus. Furthermore, this liberation of chlorine accelerates the corrosion of the lead anodes, resulting in an increase in the lead content in the zinc deposited at the cathode, which may sometimes reach a value greater than that permitted by purity standards.

Attempts have already been made to remove chlorine by certain processes in particular one which is based on the insolubility of silver chloride. In this process silver nitrate is added to the solution to be dechlorinated so that a precipitate of silver chloride is formed by exchange of nitrate and chloride ions, and the precipitate is then separated from the solution. The precipitate is then treated in an aqueous medium with zinc powder, which gives zinc chloride in solution and metallic silver, which is separated.

The metallic silver is then contacted with nitric acid and thus converted into silver nitrate, which can be used again to remove chlorine from the solution. The solution of zinc chloride is either discarded, which represents a loss of zinc, or is treated with a base such as calcium hydroxide, sodium hydroxide or sodium carbonate, to precipitate the zinc as the hydroxide and obtain the chlorine from the base used.

Although the process is useful it is, however, very costly to carry out because there are always some losses during the operation stages, in particular losses of silver which represent a very costly factor in the process.

The present invention provides a process for removing chlorine from a solution of zinc sulphate comprising reducing the pH value of the solution to below 2.6 by adding sulphuric acid, and adjusting the concentration of cupric ions in the solution to a value such that after removal of the chlorine by precipitation as cuprous chloride, there remains an excess of cupric copper in the solution, the concentration of which is always greater than 0.5 g/l.

The process according to the invention for removing chlorine is simple, easy to carry out, and economical.

The process is based on the fact that it is possible to use copper in the cuprous state to produce under certain conditions cuprous chloride which precipitates out and enables chlorine to be removed from a solution of zinc sulphate until the chlorine content falls below a residual level which does not interfere greatly with electrolysis.

This residual chlorine content is governed by the equilibria in the following reactions:

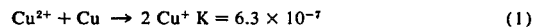  (1)

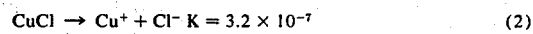  (2)

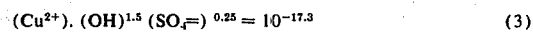  (3)

From reactions (1) and (2) it can be seen that the chlorine content is related to the cupric copper content in the solution; the following formula is obtained after calculation:

$$C_{Cl} = \frac{1.1405}{\sqrt{C_{Cu^{2+}}}} \qquad (4)$$

where $C_{Cl}$ is the residual chlorine content in the solution expressed in g/l, and $C_{Cu^{2+}}$ is the concentration of the cupric copper in the solution expressed in g/l.

This formula (4) enables the following equilibrium values to be calculated at 25° C:

| $Cu^{2+}$ | Cl |
|---|---|
| 1 g/l | 0.114 g/l |
| 0.5 g/l | 0.163 g/l |
| 0.25 g/l | 0.228 g/l |
| 0.05 g/l | 0.510 g/l |

Using equation (3) it is found that for normal concentrations of sulphate ions in solution, which are about 200 to 250 g/l, the pH value should not exceed 2.618 if it is desired to maintain a concentration of at least 1 g/l of cupric copper in order to precipitate chlorine at a concentration below 0.114 g/l.

It is thus apparent that if the pH value is less than 2.6 the final content of cupric copper is greater than 0.5 g/l, and the residual chlorine content in the solution can be reduced to a value below 0.163 g/l on condition that in the solution there is an amount of introduced or produced cuprous copper stoichiometrically equivalent to the amount of chlorine to be removed.

In order to provide cuprous copper in the solution a cupric salt such as cupric sulphate may be added to the solution from which the chlorine is to be removed in an amount such that the copper in the cupric salt corresponds stoichiometrically to the amount of chlorine which is to be removed and leaves, after this removal of chlorine, a residual amount of copper of at least 0.5 g/l, following which zinc powder is added in an amount sufficient to convert the cupric copper not in excess into cuprous copper which, together with the chlorine, forms a precipitate of cuprous chloride.

During this operation the following reactions occur:

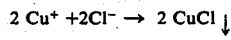

Alternatively a mixture of a cupric salt and copper powder may be added to the solution from which chlorine is to be removed in amounts such that after the conversion of cupric copper to cuprous copper and the formation of a precipitate of cuprous chloride, there remains in the solution an excess of cupric copper of about 0.5 g/l.

The reactions which take place are the following:

$$Cu + Cu^{2+} \rightarrow 2 Cu^+$$

$$2 Cu + 2Cl^- \rightarrow 2 CuCl \downarrow$$

In yet another alternative procedure, a cuprous salt, for example cuprous oxide, is added to the solution from which chlorine is to be removed and to which there has previously been added a cupric salt in an amount such that the concentration after the removal of chlorine is greater than 0.5 g/l.

The reactions which take place are as follows:

$$Cu_2O + H_2SO_4 \rightarrow Cu_2SO_4 + H_2O$$

$$Cu_2SO_4 + ZnCl_2 \rightarrow ZnSO_4 + 2 CuCl \downarrow$$

By using one of these methods the chlorine content in a solution of zinc sulphate can be reduced to a value which does not interfere with electrolysis, the chlorine always being removed in the form of cuprous chloride.

The method which uses a cuprous salt such as cuprous oxide has the advantage that it does not use zinc or copper powder for the amount of copper which is converted into cuprous chloride.

The cuprous chloride can be converted into cuprous oxide by suspending the cuprous chloride in water and adding a sufficient amount of a base such as sodium hydroxide, the chloride of which is soluble.

The reaction is as follows:

$$2 CuCl + 2NaOH \rightarrow Cu_2O + 2NaCl + H_2O$$

On the one hand a precipitate of cuprous oxide is obtained which is collected and washed, and can be used again for a further chlorine removal operation. On the other hand a solution of sodium chloride is obtained which contains the chlorine removed from the sulphate solution; this chloride solution can be used for any desired purpose.

The cupric copper left in excess from the chlorine removal procedure is cemented with zinc powder and the product obtained is then suspended in an acid solution derived from zinc electrolysis solutions and heated to 80° C and into which air is injected; under these conditions copper as metal is oxidized and converted into copper sulphate.

The accompanying drawing is a flow diagram of an industrial embodiment of the present invention.

In the drawing, copper sulphate is added to the system in order to compensate for losses in copper, and zinc powder is added to the chlorine removal stage to start the process when there is no longer any production of cuprous oxide and to compensate for any possible subsequent reoxidation of the cuprous oxide.

The invention will be further described with reference to the following illustrative Examples.

EXAMPLE 1 (Starting Up)

Galvanization ash containing metallic zinc, zinc oxide and zinc chloride was used as starting material. 10 g of starting material containing 6.13% Cl and 76.30% Zn were added to a trommel where they were leached with 50 liters of an acid solution derived from electrolysis cells and containing $H_2SO_4$ in a concentration of about 162 g/l.

After leaching, 2 kg of metal containing about 96% of zinc was separated, and an acid solution containing about 11.50 g/l of Cl and 7 g/l of $H_2SO_4$ was collected. 10 liters of this solution were withdrawn and the $H_2SO_4$ concentration was brought to 20 g/l, the concentration of $Cl^-$ being 10.79 g/l. This solution was heated to a temperature of about 30° C and 830 g of $CuSO_4.5H_2O$ containing 25% Cu was added.

After dissolving the $CuSO_4.5H_2O$, 108.5 g of zinc dust containing 90% zinc and which had been previously moistened was added. The mixture was allowed to react for about 30 minutes, following which the chlorine and copper in the solution were determined: the Cl concentration was found to be 1.384 g/l and the Cu concentration about 4 g/l.

At this point an extra 15.1 g of zinc dust was added and the mixture was allowed to react for about 1 hour, following which the chlorine and copper were redetermined, whereupon it was found that the Cl concentration was 0.24 g/l and the Cu concentration was 0.900 g/l.

The reaction was stopped, the mixture was decanted and filtered, and 10.55 l of filtrate were collected; the concentrations of Cl and Cu were respectively 0.23 g/l and 0.910 g/l. The CuCl precipitate which was collected was not analyzed since it was converted into $Cu_2O$ in the manner explained below.

The following calculations were made:
Amount of Cl removed:

(10 liters × 10.79 g/l) − (10.55 liters × 0.23 g/l) = 105.49 g.

Copper theoretically bonded to Cl and removed as CuCl:

$$101.49 \ g \times \frac{63.54}{35.45} = 189.0848 \ g$$

Copper left in solution: 0.91 g/l × 10.55 = 9.6005 g
Total amount of Cu present was thus 189.0848 g + 9.6005 g = 198.6853 g.
Amount of copper added with the 830 g of $CuSO_4.5H_2O$ containing 25% Cu was 207.5 g.
Metallic Zn theoretically necessary:

$$\frac{189.0848 \times 65.38}{2 \times 63.54} = 97.28 \ g$$

Metallic Zn actually added:

(108.5 g + 15.1 g) 0.92 = 113.71 g.

Amount of metallic copper formed:

207.5 − 198.6853 = 8.0147 g

Amount of zinc necessary to reduce this copper in metallic form:

$$8.0147 \times \frac{65.38}{63.54} = 9.07 \ g$$

Total amount of zinc necessary:

| | |
|---|---|
| to form $Cu^+$ | 97.28 g |
| to form Cu | 9.07 g |
| total | 106.35 g |

Excess Zn:

113.71 − 106.35 g = 7.36 g

From this it was assumed that some of the Zn was hydrolyzed directly with the liberation of hydrogen.

The CuCl precipitate collected above was then treated to convert CuCl into $Cu_2O$ in the following manner. The precipitate was rewashed and then slowly added to 600 cc of an aqueous solution containing 118.9 g of NaOH. After one hour's reaction the pH rose to 11 and a precipitate of $Cu_2O$ was formed which was recovered and washed three times with 300 cc of water.

The Cl, Cu and Na concentrations were determined in the filtrate and wash water and the following results were obtained.

|  | Volume | Cl | Cu | Na |
|---|---|---|---|---|
| filtrate | 510 cc | 115.73 g/l | 0.5 mg/l | 82 g/l |
| 1st wash water | 270 cc | 115.0 g/l | 8 mg/l | 84.5 g/l |
| second wash water | 295 cc | 29.82 g/l | 0.5 mg/l | 12.7 g/l |
| 3rd wash water | 410 cc | 1.77 g/l | 0.5 mg/l | 1.2 g/l |

The following calculations were made:
Total amount of chlorine contained in the filtrate and wash waters:

$$(0.51 \times 82) + (0.27 \times 84.5) + (0.295 \times 12.7) + (0.41 \times 1.2) = 8.8735 \text{ g}$$

Total amount of Na contained in the filtrates:

$$(0.51 \times 82) + (0.27 \times 84.5) + (0.295 \times 12.7) + (0.41 \times 1.2) = 68.8735 \text{ g}$$

Amount of Na contained in the NaOH added:

$$118.9 \times \frac{22.99}{39.99} = 68.35 \text{ g}$$

Since 105.49 g of Cl had been added with the CuCl, there was thus 105.49 g − 99.6 g = 5.89 g of Cl in the $Cu_2O$; in other words, about 5% of the Cl is reintroduced in the chlorine removal stage. It was also deduced that no sodium was reintroduced in the chlorine in the chlorine removal stage.

EXAMPLE 2 (Steady State)

10 liters of the acid solution of Example 1 above were taken after the leaching of the galvanisation ash. The concentration of $H_2SO_4$ in this solution was adjusted to 20 g/l and the solution was heated to 40° C; cupric sulphate was added to bring the copper content in the solution to about 0.480 g/l. All the moist $Cu_2O$ recovered from Example 1 above was next added, i.e. about 350 g.

The mixture was allowed to react for about 30 minutes and the chlorine in the solution was then determined: a value of about 390 mg/l was found. The mixture was decanted and filtered; the CuCl precipitate was collected and suspended in 0.6 l of water, and 124.1 g of NaOH were added. The mixture was left to react for 1 hour, after which time the pH was 11. A precipitate of $Cu_2O$ was formed which was recovered by filtration and was then washed three times with 300 cc of water. The filtrate was collected, and also the wash waters, and the Cl, Cu and Na concentrations were determined. The results were as follows;

| volume | Cl | Cu | Na |
|---|---|---|---|
| filtrate | 0.555 l | 110.76 g/l | 0.7 mg/l | 78 g/l |

-continued

| volume | Cl | Cu | Na |
|---|---|---|---|
| 1st wash water | 0.275 l | 113.60 g/l | 1.1 mg/l | 81.5 g/l |
| 2nd wash water | 0.295 l | 24.85 g/l | 0.5 mg/l | 17.25 g/l |
| 3rd wash water | 0.410 l | 1.63 g/l | 0.5 mg/l | 1.01 g/l |

The following calculations were made:
Total amount of Na contained in the filtrate and wash waters:

$$(0.555 \times 78) + (0.275 \times 81.5) + (0.295 \times 17.25) + (0.41 \times 1.01) = 71.21 \text{g}$$

Amount of sodium contained in the NaOH added:

$$124.1 \text{ g} \times \frac{22.99}{39.99} = 71.34 \text{ g}$$

It was therefore deduced that no sodium was recirculated in the chlorine removal stage.
Total amount of Cl contained in the filtrate and wash waters:

$$(0.555 \times 110.76) + (0.275 \times 113.60) + (0.295 \times 24.85) + (0.410 \times 1.63) = 100.71 \text{ g.}$$

Amount of chlorine contained in the CuCl = Cl contained in the initial solution + Cl contained in the $Cu_2O$ added - chlorine in the final solution = (10 × 10.792 g/l) + 5.89 g - (10.570 × 0.337) g/l = 110.25 g.
Amount of chlorine which was recirculated in the chlorine removal stage: 110.25 − 100.71 = 9.54 g.

What is claimed is:
1. A cyclic process for removing chloride ions from a sulfuric acid solution of zinc sulphate, wherein the pH of said solution is below 2.6 and the cupric ion content of said solution is at such a value that after removal of the chlorine by precipitation as cuprous chloride, as hereinafter recited, the cupric ion concentration of said solution is at least 0.5 g/l, said process comprising adding cuprous oxide to said solution in an amount which is at least equal to the stoichiometrical amount needed for the formation of a cuprous chloride precipitate with the chloride ions present in the solution, separating the cuprous chloride precipitate from the solution and converting the cuprous chloride to cuprous oxide which is used again.
2. A process according to claim 1 in which the cuprous chloride is converted to cuprous oxide by means of a base.
3. A process according to claim 2, said base being sodium hydroxide.
4. A process according to claim 1, whereby said cyclic process is initiated by adding a cupric salt and zinc powder thereby converting the cupric copper into cuprous copper which cuprous copper reacts with said chlorine to form the precipitate of cuprous chloride.
5. A process according to claim 4, said cupric salt being cupric sulphate.
6. A process according to claim 1, whereby said cyclic process is initiated by adding a cupric salt and metallic copper in a finely divided state to the solution, thereby converting the cupric copper into cuprous copper, which cuprous copper reacts with said chlorine to form the precipitate of cuprous chloride.
7. A process as claimed in claim 6, said cupric salt being cupric sulphate.
8. A process according to claim 1, in which cupric ions in the form of cupric sulphate are added to the solution whenever the content thereof in the solution does not reach 0.5 g/l.
9. A process according to claim 1, in which the pH of the solution is lowered below 2.6 by means of sulphuric acid, whenever the pH has a higher value.

* * * * *